Jan. 25, 1966  G. A. CARRUTHERS  3,230,786
ROTARY MOTION SPEED MODULATING MECHANISM
Filed Aug. 16, 1963  4 Sheets-Sheet 1
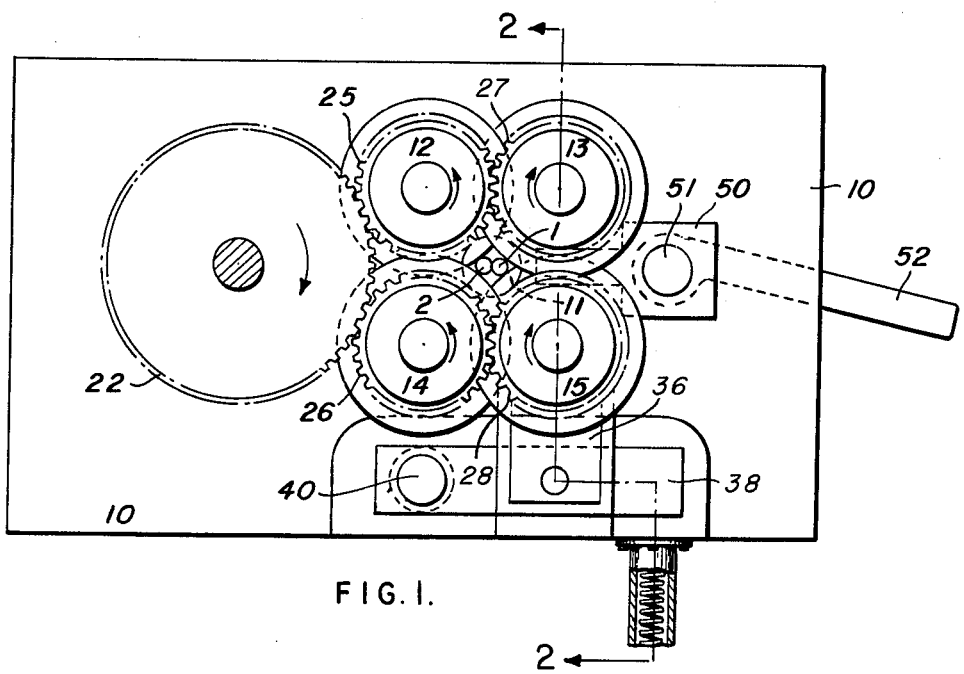
FIG. I.
INVENTOR.
GEORGE A. CARRUTHERS
BY
ATTORNEY

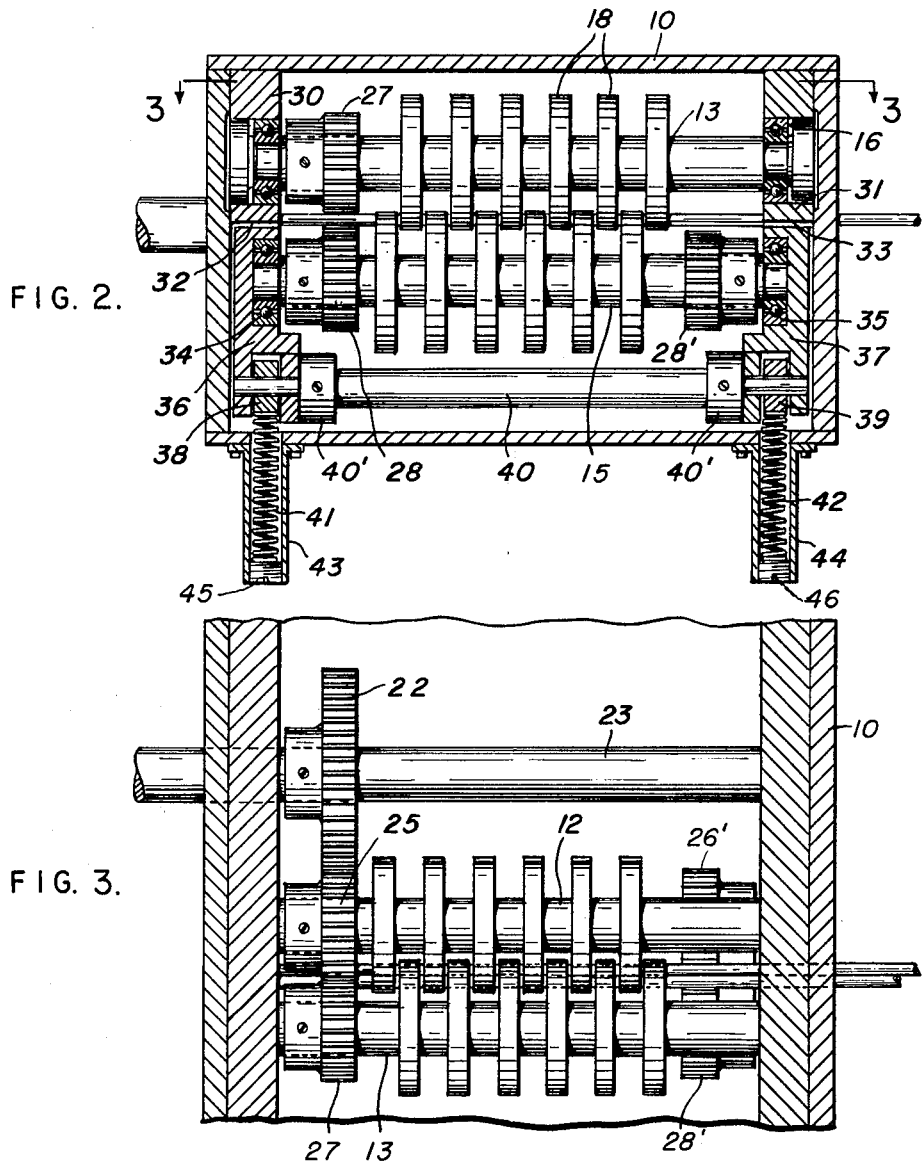

INVENTOR
GEORGE A. CARRUTHERS
BY
ATTORNEY

Jan. 25, 1966  G. A. CARRUTHERS  3,230,786
ROTARY MOTION SPEED MODULATING MECHANISM
Filed Aug. 16, 1963  4 Sheets-Sheet 4

INVENTOR
GEORGE A. CARRUTHERS
BY
ATTORNEY

United States Patent Office 3,230,786
Patented Jan. 25, 1966

3,230,786
ROTARY MOTION SPEED MODULATING
MECHANISM
George A. Carruthers, Harleysville, Pa., assignor to Turbo
Machine Company, Lansdale, Pa., a corporation of
Pennsylvania
Filed Aug. 16, 1963, Ser. No. 302,611
11 Claims. (Cl. 74—206)

The present invention relates to rotary motion transmission mechanism and is especially directed to an invention in that field of which one embodiment is disclosed in my prior copending application Serial No. 196,215, filed May 21, 1962, and this present application is therefore a continuation-in-part of said prior application.

That embodiment of the invention was designed for and is especially adapted to be used to drive a pair of elongated parallel yarn crimping rolls of small diameter at relatively high rotational speeds of the order of 150,000 r.p.m. and is well suited to the performance of that function, but mechanism operating in accordance with the same principles may within limits be utilized for driving mechanical elements of many different kinds, for example, the spindle of a high speed small diameter grinding wheel for surfacing small diameter bores or other cavities. Moreover, it may be disposed in relation to a shaft driven by other means, such, for example, as a high speed turbine, to operate as a speed reducer in which the output or driven shaft is rotated at a substantially lower rather than higher speed than the input or driving shaft.

Theoretically there should be no limit to the speed at which the more rapidly rotating of the driving and driven shafts may be operated, but there is a practical upper limit imposed by available materials and known bearing designs to the peripheral or relative surface speed of substantially every rotating body and it has been found that with peripheral speeds much in excess of about 3,000 feet per minute, excessive wear on bearings, gears and other related elements can rarely be avoided unless special materials and precision gearing are used.

However, in small shafts, such as those of the order of $\frac{1}{16}''$–$\frac{3}{8}''$ in diameter, herein sometimes referred to as rolls, a peripheral speed in the neighborhood of 3,000 ft./min. may correspond to a rotational speed of 250,000 r.p.m. or more and thus include the desirable operating ranges of many high speed tools as well as those of high speed relatively small turbines.

It is therefore an object of the present invention to provide mechanism for transmitting relatively low power from a rotating input shaft to a rotating output shaft with a high ratio speed change in revolutions per minute (r.p.m.) primarily through interengaging toothless elements rotating together on parallel axes at substantially identical peripheral speeds whereby the speed ratio in r.p.m. is a function of the relative diameters of their interengaging parts.

A further object is to enlarge the usefulness in fields of endeavor other than yarn crimping of mechanism embodying the principles of that disclosed as suitable for driving the yarn crimping rolls of my said prior copending application Serial No. 196,215, filed May 21, 1962.

Still another object is to provide power transmission means comprising a pair of elongated cylindrical shafts rotatable on parallel axes and in mutual engagement while supported from a plurality of smooth surfaced disks or like rotating elements of much larger diameter likewise on parallel axes between which and the shafts power is transmitted either to effect a speed increase when the disks are driven or a speed reduction when either one or both of the shafts is driven, the shafts and disks rotating concurrently in frictional engagement and at substantially identical peripheral speeds.

Another object is to provide in association with an interengaging pair of rotatable parallel shafts mechanical elements comprising a plurality of disks mutually overlapping with others in the direction of their parallel axes, presenting cylindrical surfaces engaging the shafts and of substantially greater diameter than the latter whereby at a given peripheral speed of the disks and shafts the ratio of their rotational speeds corresponds to the ratio of their diameters.

Other objects, purposes and advantages of the invention will hereinafter more fully appear or will be understood from the following description of certain preferred embodiments of it wherein reference will be had to the accompanying drawings in which:

FIG. 1 is a diagrammatic fragmentary end view of the yarn crimping roll drive first disclosed in my said prior application;

FIG. 2 is a vertical partial section thereof staggered along the line 2—2 in FIG. 1;

FIG. 3 is a fragmentary horizontal partial section on line 3—3 of FIG. 2;

Figure 4:
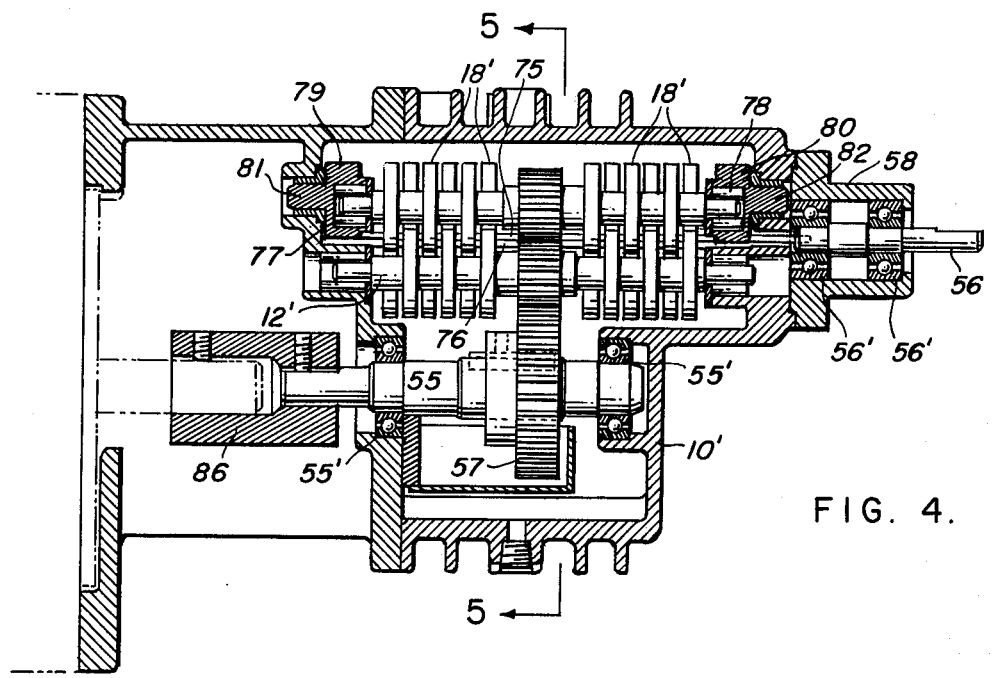
FIG. 4 is a vertical section generally corresponding to FIG. 2 but illustrating another embodiment of the invention.

The mechanism illustrated in FIGS. 1–3 as first disclosed in my said prior application is described therein substantially as follows:

The driving means for coiling rolls 1, 2 comprise supporting housing 10 into which they extend through an opening 11 and in which are disposed cooperative pairs of drive rolls 12, 13 and 14, 15. Each of these latter rolls, which may be identical and turned integrally from bar stock or the like, has reduced ends receivable respectively in a suitable bearing, those on rolls 12, 13, 14 being exemplified by bearing 16 adjacent one wall of the housing while those on roll 15 are movably supported as will hereinafter more fully be described. Between their reduced ends the drive rolls are grooved to provide a plurality of spaced integral disks 18 on each, so disposed with respect to the roll ends that when two of the rolls are turned end for end and their ends mounted in transversely aligned supports the lands of each roll project within the imaginary cylinder defined by the lands of the other, as shown in FIGS. 1, 2 and 3, the lands on rolls 12, 14 to the rear on rolls 13, 15 in FIG. 2 and those on rolls 14, 15 below rolls 12, 13 in FIG. 3 as well as certain of the gears used for driving them being omitted from these latter two figures for clearness of illustration.

The said rolls are driven from gears, including a main driving gear 22 fixed to a shaft 23 driven from any suitable prime mover (not shown), gear 22 meshing with spur gear 25 adjacent one end of drive roll 12 and with a similar gear 26 adjacent the corresponding end of drive roll 14 the other end of which carries a gear 26'. Like gears 27 on drive roll 13 and 28, 28' proximate the ends of drive roll 15 mesh with and are driven by gears 25, 26, 26' respectively. These several rolls have reduced ends projecting as stub shafts into adjacent antifriction bearings, those supporting drive rolls 12, 13, 14 being received in suitable apertures in plates 30, 31 fixed to the adjacent walls of housing 10, the said plates defining openings 32, 33 adjacent the bearings 34, 35 supporting drive roll 15 and its gears 28, 28'. These bearings are disposed in movable blocks 36, 37 pivotally carried by levers 38, 39 supported at one end from a transverse pivot rod 40 carried by the housing walls and provided with collars 40' which prevent axial movement of the levers. At their other ends the levers are engaged by compression springs 41, 42 disposed in tubes 43, 44 depending from the housing and provided with threaded plugs 45, 46 whereby the pressure of the springs against the levers may be appropriately adjusted to control in turn the pressure of the lands on the drive rolls against coiling rolls 1, 2 when the latter are disposed in the housing in engagement with the drive rolls in the manner best illustrated in FIG. 1. Pivoted stops 50 may be mounted on a transverse shaft 51 adjacent roll 15 at each end of the housing so that when actuated by a lever 52 fixed to shaft 51 outside the housing roll 15 can be depressed to enable the coiling rolls to be removed from or replaced in the housing, the stops, lever and shaft being omitted in FIGS. 2 and 3 to facilitate illustration of other parts.

As shown in FIG. 1 the intermeshing of the lands and grooves of rolls 12–15 enables them in effect to define a space bounded by arcs intersecting in four cusps in an opposed pair of which the drive rolls frictionally engage the surfaces of the coiling rolls to rotate the latter in mutual engagement at the high speed essential for most effective production of coiled yarn, the direction of rotation of the several driving rolls as well as that of gear 22 being indicated by arrows in FIG. 1 from which it will be evident the coiling rolls are turned in opposite directions so as to pass the yarn through their nip from top to bottom in said figure, i.e., roll 2 turning clockwise and roll 1 counter-clockwise therein, the yarn passing between the rolls at some point (not shown) outside the housing 10.

The drive rolls which, as noted, have roll driving lands many times the diameter of the coiling rolls, rotate of course at peripheral speed corresponding to that of the latter but due to their larger diameter, at a much lower rotational speed. They as well as the gears driving them, are supplied with lubricant in any convenient manner and I prefer to keep the drive unit housing 10 fully enclosed during operation as the high speed of the moving parts tends to atomize the lubricant and an atmosphere in the housing well occupied by submicroscopic particles of it tends to insure its adequate distribution over the surfaces of the moving parts.

Figure 5:
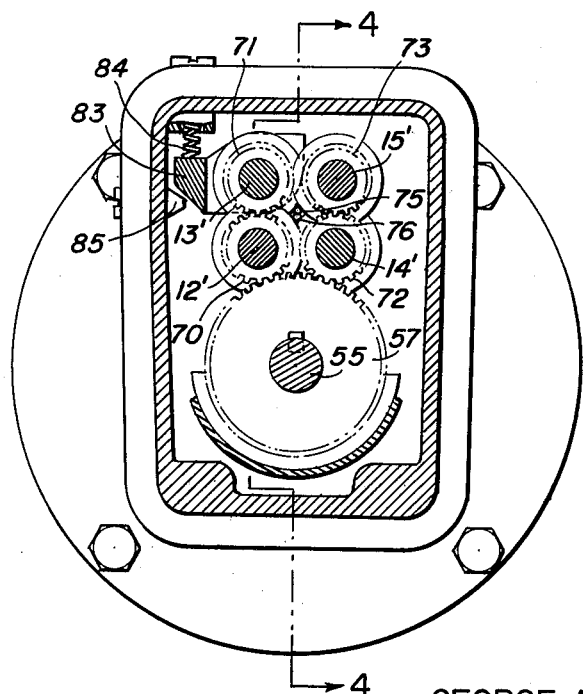
FIG. 5 is a transverse partial section on line 5—5 in FIG. 4, wherein the line 4—4 indicates the plane of section of the latter figure.

Referring now more particularly to the embodiment of the invention illustrated in FIGS. 4 and 5, it is designed for use interchangeably either as a speed increasing unit for transmitting power at greatly increased rotational speed between a low speed shaft 55 and a high speed shaft 56, or when shaft 56 is rotated at high speed from an outside source (not shown) to transmit power at much lower rotational speed from it to shaft 55.

The mechanical elements of this embodiment are enclosed in a housing 10' which provides aligned recesses for reception of antifriction bearings 55' supporting shaft 55 to which a main spur gear 57 is keyed. Likewise in a removable extension 58 shaft 56 is supported from antifriction bearings 56'. Between these two shafts, in the sense of the direction of power flow, are disposed driving rolls 12', 13', 14' and 15' which in this instance are provided with spaced intermeshed disks 18' disposed in groups respectively adjacent the ends of the rolls with intermeshing gear pairs 70, 71 and 72, 73 between them, the first of each of these pairs of gears meshing with gear 57 on shaft 55 while parallel interengaging rolls 75, 76 are engaged by the disks for frictional transfer of power. Roll 75 is directly connected with shaft 56 in alignment therewith while roll 76 is in effect an idler, having power transmitting connection only with roll 75 and the disks.

To enable the disks to bear yieldingly with controllable pressure against rolls 75, 76, roll 13' is mounted in antifriction bearings 77, 78 carried in bushings 79, 80 having eccentric stub shafts 81, 82 supported in suitable bushings disposed in housing 10', the bushings constituting the end portions of a preferably integral yoke 83 biased under an adjustable spring 84 to maintain pressure of the disks against rolls 75, 76, a stop 85 limiting the eccentric movement of the yoke to prevent injury to other parts when rolls 75, 76 are removed. The rolls 12', 14', 15' are, of course, supported in appropriate antifriction (preferably roller) bearings, of which only those supporting roll 12' are indicated. As illustrated in FIG. 4 shaft 55 is shown as carrying a coupling sleeve 86 but it will be apparent this is merely representative of the many known mechanical elements available for connecting together axially aligned rotatable shafts.

The mechanisms hereinabove described have in common transmission of power between rotatable shafts by frictional engagement of intermeshed smooth surfaced disks with smooth surfaced rollers of much smaller diameter. In that illustrated in FIGS. 1–3 the small diameter rolls themselves perform a useful function by receiving outside the housing 10 continuous filament yarn to crimp it, whereas in FIGS. 4 and 5, the mechanical power transmission unit is shown unconnected with any prime mover or with work performing mechanism of any kind but it will be understood from the foregoing that many uses for it will be apparent to those skilled in the art.

There are, of course, limitations upon useful applications of the principles of my invention as, for example, the maximum speed at which mechanisms embodying it can be operated, for in this present state of development, it is believed satisfactory operating life for antifriction bearings supporting a rotatable shaft, and gears, if any, connected therewith, cannot be expected, using ordinary commercial gears, when relative peripheral speed anywhere much exceeds 3,000 ft./min. Hence while in the embodiments illustrated rolls 1, 2 and 75, 76 do not in themselves require supporting bearings, being journaled on the respective disks and hence theoretically without limit upon the speed at which they may be rotated since relative peripheral speed between the rolls and the disks is virtually zero, obviously other elements connected to them or their prolongations must be supported on bearings while the gears by which the disks are driven or which transmit power from the rolls, as the case may be, are likewise subject to the limitation noted.

Consequently when the rolls 1, 2 or 75, 76 are 1/16" in diameter rotational speeds of the order of 250,000 r.p.m. are feasible for them but when their diameter is 1/8" their maximum speed is reduced to about 125,000 r.p.m. at a corresponding maximum surface speed of the disks of 3,000 ft./min.

It can be shown that the surface speed of the disks must bear a relation to the pitch line speed of the associated gears such that $$\frac{\text{Surface speed of disks}}{\text{Pitch line speed of gear}} = 1.1 \text{ to } 1.8$$

Figure 7:
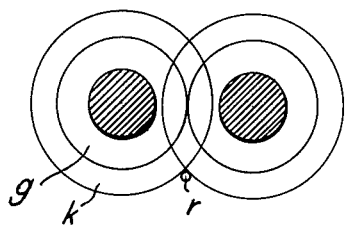
FIGS. 7, 8 and 9 are diagrammatic graphic representations of certain limiting dimensional ratios useful in designing embodiments of the invention.
Figure 8:
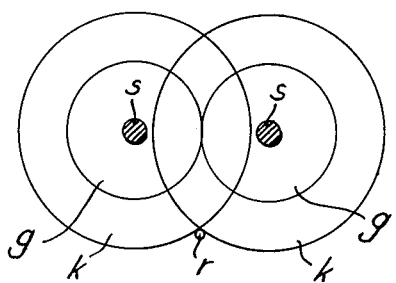
Figure 9:
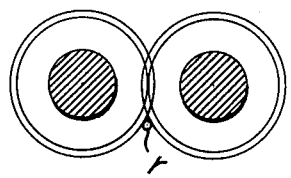

As a practical matter this ratio should be kept well within the limits stated, and preferably in the neighborhood of 1.4. The reason for this is diagrammatically illustrated in FIGS. 7, 8 and 9, FIG. 7 indicating the relative diameters of the disks $k$ and gears $g$ when the last mentioned ratio obtains. In FIG. 8, at the ratio of 1.8 it is apparent the supporting shafts $s$ for the gears and disks must be made too small to be dependable and at the ratio of 1.1 (FIG. 9) the condition is approached where interference of the gears with the disks and their engaging roll $r$ may occur. In the following calculations it is assumed the above ratio has the recommended value of 1.4.

In any event the rotational speed of roll $r$ is inversely proportional to its diameter at any given surface speed of disks $k$ and it follows that $$N = \frac{S \times 12}{\pi d} \quad (1)$$

where N is the speed in r.p.m. of the roll $r$, S is the peripheral speed of the latter in ft./min. and $d$ the diameter of roll $r$ in inches.

If the maximum practical pitch line speed of the gears be expressed as $v$ ft./min. it follows from the foregoing that the practical maximum value for S is $1.4 \times v$. Substituting in Equation 1 it therefore appears $$N = \frac{1.4v \times 12}{\pi d} = \frac{5.347v}{d} \text{ r.p.m.} \quad (2)$$

Assuming that the pressure exerted by the disks against the rolls is sufficient to prevent appreciable slippage and that the gears are adequately designed, then the power transmitting capacity of the unit will be limited only by the torsional strength of the rolls themselves. If the rolls are made from carbon steel they may be safely stressed to 6,000 pounds per square inch, and under these conditions the power transmitting capacity of the unit is conservatively given by the formula $$\text{H.P.} = \frac{d^3 N}{54} \quad (3)$$

As N has herein been shown to have the value $$\frac{5.347 \times v}{d} \text{ r.p.m.}$$

substituting in 3:

$$\text{H.P.} = \frac{5.347 \times v}{d} \times \frac{d^3}{54} = .099 v d^2 \quad (4)$$

Figure 6:
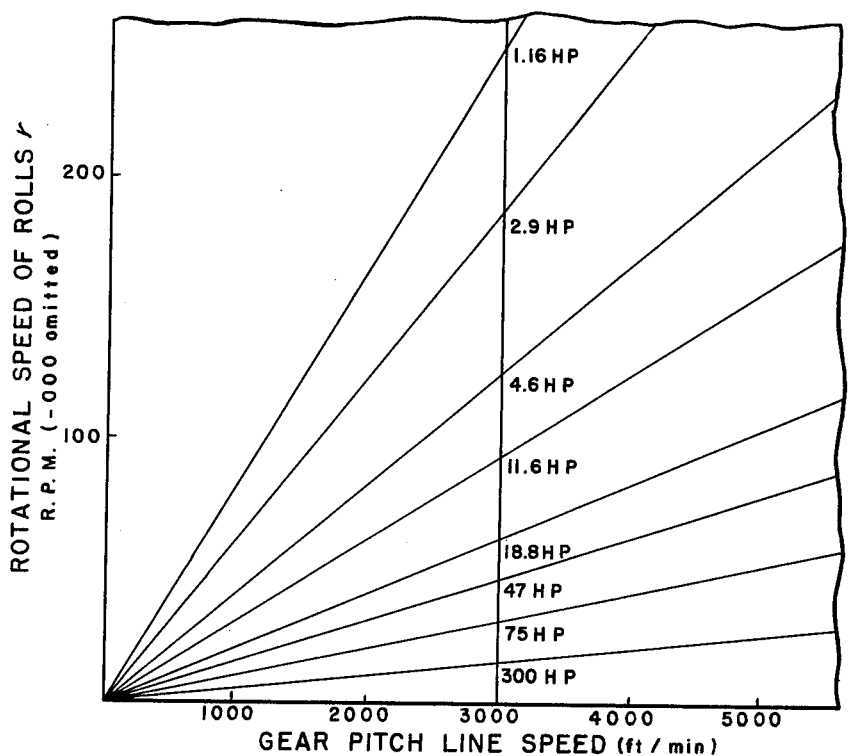
FIG. 6 is a chart showing the relative speeds of rotation attainable with several different sizes of shafts arranged for transmitting power through a speed modulator constructed in accordance with the invention.

On this basis FIG. 6 represents the power transmission capability of the unit and shows that $\frac{1}{16}''$ diameter rolls $r$ under a shaft stress of 6,000 lbs./in.² when rotating in contact with disks bearing the above 1.4 relation to gears operating at a pitch line speed of 3,000 ft./min. transmit 1.16 H.P., $\frac{3}{32}''$ diameter shafts 2.9 H.P., $\frac{1}{8}''$ diameter shafts 4.6 H.P. and so on, the power capacities increasing at constant pitch line speed as the diameters of the rolls are increased. It will, of course, be appreciated that certain of the extreme values represented on the chart of FIG. 6 are theoretical only, since, for example, a transmission of 300 H.P. when roll $r$ is 1'' in diameter and rotating at more than 15,000 r.p.m. when the pitch line speed is 3,000 ft./min. is unlikely of attainment with presently known materials in a unit of convenient size. Furthermore, as each size unit rated according to the diameter of its disks has different power transmission capacities, the foregoing calculations and FIG. 6 must be taken to be exemplary only and not to suggest that general formulas applicable to all sizes, speeds, and power transmitting capacities are thereby represented.

This apparatus, however, may be considered as one designed for transmitting power between shafts 55, 56 through a friction drive by contact of moving surfaces with the surface of roll 75 connected directly to shaft 56 at three lines parallel to and circumferentially spaced with respect to the axis of that roll, two of such lines corresponding respectively to the lines of contact of driving rolls 13', 15' with roll 75 while the third corresponds to the line of contact of roll 76 with roll 75; roll 76 although referred to above as an idler is thus in the embodiment illustrated a third driving roll driven in turn by rolls 12', 14' cooperative with rolls 13', 15' to drive roll 75. It is therefore not essential that roll 76 be of the same diameter as roll 75 and if it be of appreciably larger diameter obviously its rotational speed may be less than that of roll 75 while its peripheral speed remains the same. It will of course be appreciated that means other than rolls 13', 15' may be employed for driving roll 76 especially when it is appreciably larger in diameter than roll 75; the utilization for this purpose of driving rolls substantially identical with rolls 12', 14' is thus for convenience only and to facilitate the disclosure of the fundamental principles of the invention which reside primarily in the line contact of three moving cylindrical surfaces circumferentially spaced about and frictionally engaging the cylindrical surface of roll 75, whether it be the driving or the driven roll, at least two of said cylindrical surfaces being of considerably larger diameter than the roll and having their axes spaced apart a distance smaller than that corresponding to the sum of their radii. Moreover especially when shaft 56 is the driving shaft roll 76 may be regarded as a true idler if rolls 12', 14' are disposed rotatably with respect to gears 70, 72 or the said gears are omitted in which case the latter rolls also are idlers and serve merely to back up roll 76 to insure its snug frictional engagement with roll 75 and hence engagement of the latter with rolls 13', 15' through which alone with this arrangement power is transmitted between shafts 55, 56.

Normally, however, all three lines of contact of friction elements with roll 75 are maintained as power transmitting zones and the gears connecting shaft 55 and rolls 12', 13', 14', 15' are so related to each other as to maintain equality of peripheral speed among themselves and between rolls 75, 76 to thereby transmit power at a wide divergence of rotational speeds between the driving and the driven shaft, whether these be shafts 55, 56 respectively or vice versa.

I have herein described with considerable particularity the embodiments of the invention illustrated in the drawings and suggested certain mathematical formulas which I consider useful adjuncts to the designing of other embodiments of it, but I do not desire or intend thereby to limit or confine myself thereto or thereby in any way, as numerous changes in the form, structure arrangement and relationship of the several elements and components herein disclosed will readily occur to those skilled in the art and may be utilized if desired without departing from the spirit and scope of the invention as defined in the appended claims.

Having thus described my invention, I claim and desire to protect by Letters Patent of the United States:

1. A friction drive for a pair of elongated parallel rolls comprising a plurality of grooved rollers disposed in pairs with their axes parallel to the axes of the rolls, the grooves on each roller defining lands between adjacent grooves, at least one of the lands on each roller extending into a groove in the other roller of its pair, into a groove in one of the rollers of the other pair and into contact with one of said rolls, a pair of intermeshing gears associated respectively with the rollers of each pair, and means for driving one of the gears of each pair.

2. Mechanism for modulating rotational speed between a driving and a driven shaft comprising a pair of parallel mutually engaging rolls, one of which is connected to one of the shafts, a plurality of rotatable disks disposed in spaced groups about the rolls, all the disks in each group being non-rotatable relatively to the other disks in said group and rotatable therewith relatively to the disks of an adjacent group, certain of the disks of each group extending between disks of an adjacent group and into engagement with one of said rolls, gearing connecting the disks of each group with the other of said shafts for transmission of rotary motion therebetween and means supporting each group of disks for independent rotation about a common axis.

3. Mechanism as defined in claim 2 in which the supporting means for one of said groups of disks is yieldingly mounted for transverse movement toward and away from the rolls for cooperation with the other groups of disks to embrace the rolls.

4. Mechanism as defined in claim 2 in which the supporting means for one group of disks comprises spring biased pivoted levers.

5. Mechanism as defined in claim 2 in which the supporting means for one group of disks comprises a yoke including eccentric bushings in which said supporting means are journaled, and yielding means for rotating the yoke about an axis parallel to and spaced from the group axis to thereby translate the group toward and away from the rolls.

6. Rotary motion transmission mechanism comprising a plurality of axially spaced disks of equal diameter rotatable about a common axis and non-rotatable with respect to each other, other like disks rotatable about other axes parallel to the first axis, at least some of the disks rotatable about each axis extending between disks rotatable about an adjacent axis and a pair of elongated interengaging parallel rolls each engaging a plurality of said disks.

7. Rotary motion transmission mechanism comprising a pair of interengaging parallel rolls, a pair of disks rotatable about spaced axes parallel to those of the rolls engaging one of the rolls, said disks being axially offset with their axes spaced apart a distance less than the sum of the radii of said disks, another like pair of disks engaging the other roll each being offset axially relatively to one of the disks of the first pair and each having its axis spaced from the axis of said disk from which it is offset a distance which is less than the sum of its radius and the radius of said disk from which it is offset, the disks of said other pair being axially offset with respect to one another with their axes spaced apart a distance which is less than the sum of their radii.

8. Mechanism for modulating rotational speed between a driving and a driven shaft comprising a roll connected to one of the shafts, a second roll rotatable about an axis parallel to that of the first roll and frictionally engaging said first roll, a plurality of rotatable disks disposed in spaced groups in frictional engagement with the first roll in zones circumferentially spaced with respect to the axis of the first roll from the zone of interengagement of the rolls, gearing connecting the disks of each of said groups with the other of said shafts, and means for supporting the disks of each group for unitary rotation respectively about common parallel axes radially spaced from each other a distance less than the sum of the radii of the disks.

9. Apparatus as specified in claim 8 including yielding means biasing one of said rolls toward the other to thereby maintain frictional engagement between them.

10. Mechanism for modulating rotational speed between a driving and a driven shaft comprising a roll connected to the driving shaft, a substantially similar second roll rotatable about an axis parallel to that of the first roll and engaging said first roll, a pair of disks rotatable respectively about axes parallel to that of the first roll and spaced apart a distance less than the sum of the radii of said disks frictionally engaging said first roll, and means interconnecting at least one of said disks with the driven shaft for transmission of power thereto from said first roll.

11. Mechanism for modulating rotational speed between a driving and a driven shaft comprising a roll connected to the driven shaft, a substantially similar second roll rotatable about an axis parallel to that of the first roll and engaging said first roll, a pair of disk rotatable respectively about axes parallel to that of the first roll and spaced apart a distance less than the sum of the radii of said disks frictionally engaging said first roll, and means interconnecting at least one of said disks with the driving shaft for transmission of power therefrom to said first roll.

References Cited by the Examiner
UNITED STATES PATENTS

| 1,106,246 | 8/1914 | Schoedelin | 74—206 |
| 2,778,227 | 1/1957 | Roesch | 74—209 X |
| 2,828,938 | 4/1958 | Roesch et al. | 74—209 X |
| 2,947,580 | 8/1960 | Fisher. | |

DON A. WAITE, *Primary Examiner.*